United States Patent Office 2,997,056
Patented Aug. 22, 1961

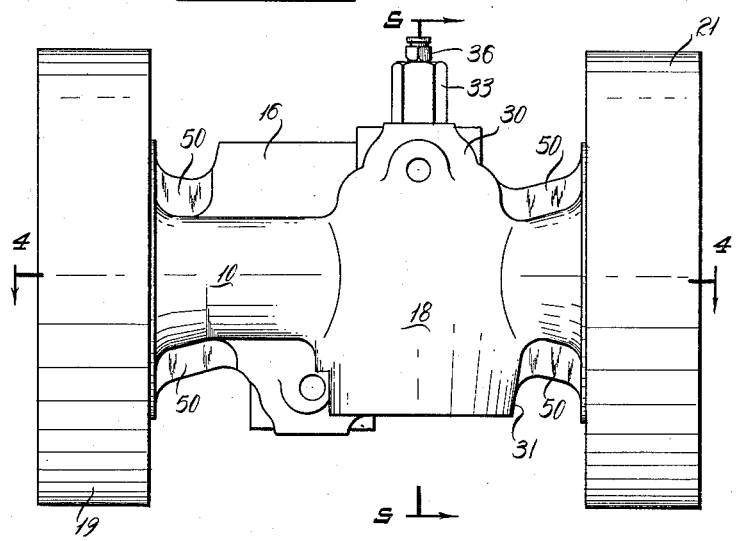
Fig. 1
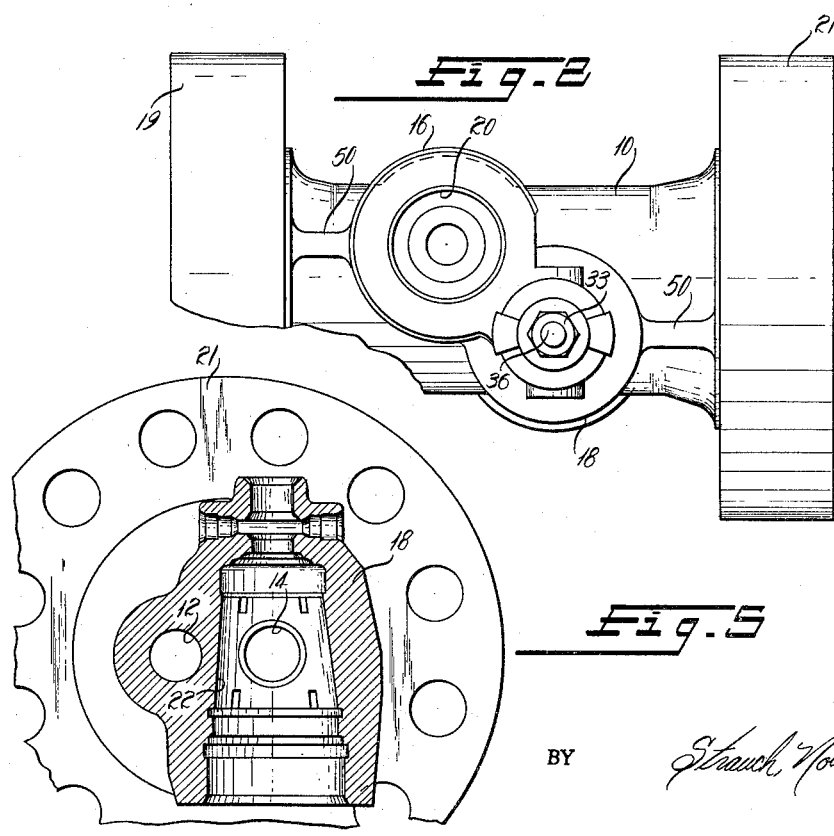
Fig. 2
Fig. 3
INVENTOR
J. L. MASSEY
BY Strauch, Nolen + Neale
ATTORNEYS

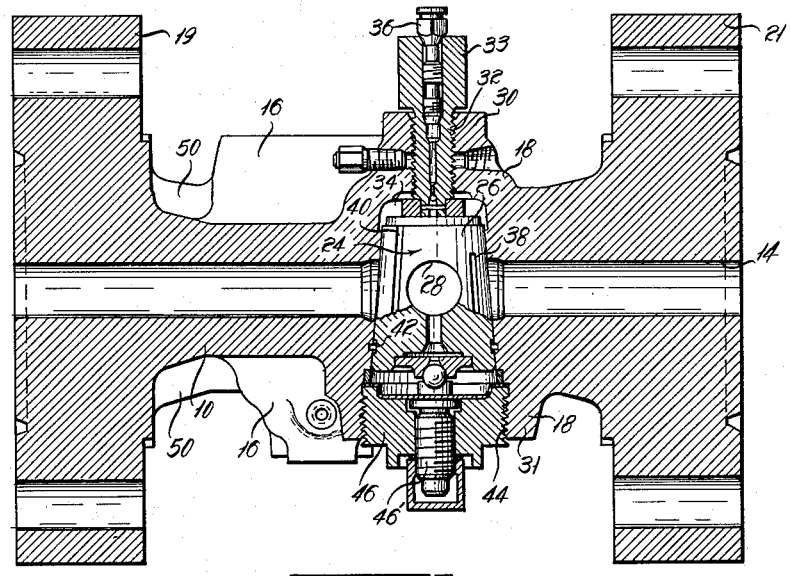
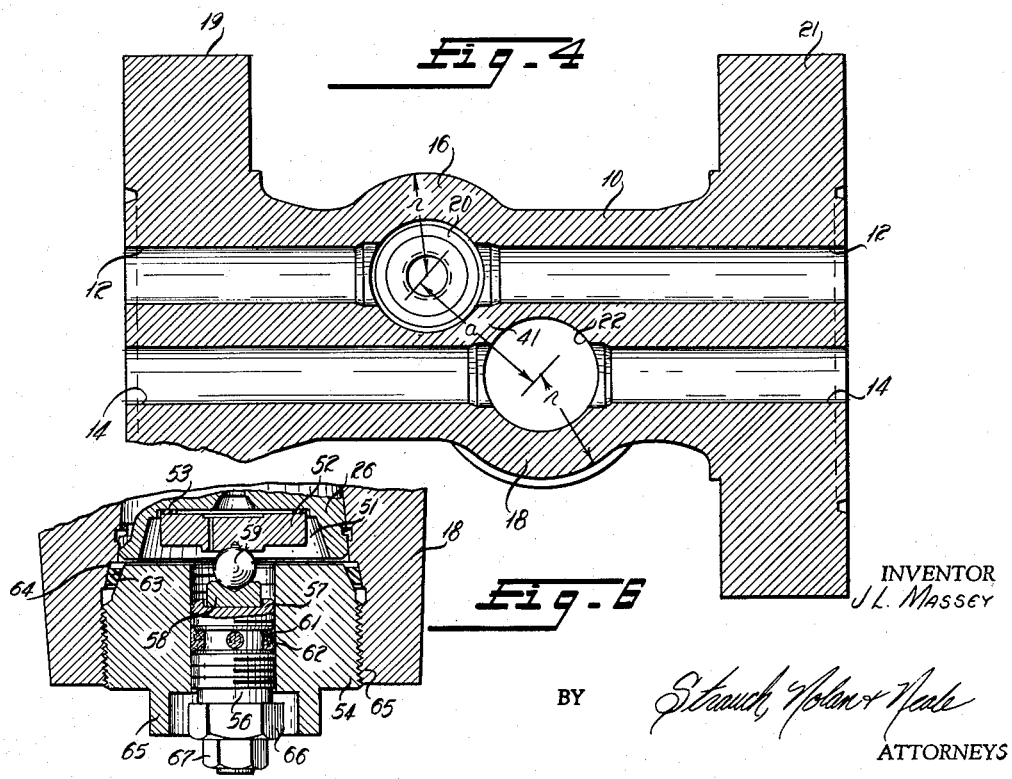

2,997,056
LUBRICATED PLUG VALVE ASSEMBLY HAVING DUAL FLUID PASSAGEWAYS
J. L. Massey, Sulphur Springs, Tex., assignor to Rockwell Manufacturing Company, Pittsburgh, Pa., a corporation of Pennsylvania
Filed Feb. 25, 1958, Ser. No. 717,409
5 Claims. (Cl. 137—246.15)

This invention relates to lubricated plug valves and more particularly to a lubricated tapered plug valve assembly having a pair of adjacent passageways for conducting two separate and individual flows of fluid such as oil and gas from different producing strata of an oil well.

With present-day oil well producing equipment, it is possible in a single well to obtain production from an upper and a lower producing stratum either simultaneously or alternately. Often it is desirable to introduce gas from one stratum into an oil-containing stratum in order to increase pressure therein and also to avoid waste of the gas. These practices are of course well known in the oil producing art.

In the handling of different fluids through separate pipe lines in such oil well producing equipment, it is necessary to provide a valve in each pipeline or fluid passageway in order to control individually the flow through each as desired. Either a valve assembly must be provided for each fluid passageway, or a valve assembly used having dual fluid passageways therethrough with a valve effective in each passageway. It is impractical under certain conditions of high well-head pressure to provide single valves for the individual passageways. A valve assembly having dual passageways therethrough is essential as a practical matter but those proposed heretofore have been unduly bulky and have a tendency to freeze when not operated for long periods.

An object of this invention is to provide a novel lubricated tapered plug valve assembly having a pair of separate and individual fluid passageways therethrough with a rotatable valve plug in each passageway so that the assembly is capable of individual control of the flow of fluid through each passageway.

Another object of this invention is to provide a compact and rugged lubricated tapered plug valve assembly having a pair of separate and individual fluid passageways therethrough with a tapered plug seat formed transversely of each passageway, the larger end of one seat being closely adjacent the smaller end of the other seat.

Other objects and advantages of the invention will become apparent from the following detailed description and drawings, in which:

FIGURE 1 is a side elevation of the body for the valve assembly according to a preferred embodiment of this invention;

FIGURE 2 is a top plan view of the valve body of FIGURE 1 illustrating the relative aligned longitudinal positions of the tapered valve seats;

FIGURE 3 is a longitudinal sectional view along one of the passageways of the valve body of FIGURE 1 illustrating a tapered lubricated plug assembly mounted in one of the valve seats;

FIGURE 4 is a sectional view taken along the line 4—4 of FIGURE 1 illustrating inner details of the valve body;

FIGURE 5 is a combination sectional view of the valve body taken along the line 5—5 of FIGURE 1 and an elevational view of the mounting flange formed integrally at the end of the valve body; and FIGURE 6 is a fragmentary section illustrating a different end closure arrangement for the individual valves.

Referring now more specifically to the drawings, there is illustrated a unitary valve fitting indicated generally at 10 through which extend longitudinally a pair of closely spaced parallel adjacent fluid passageways 12 and 14 for conducting two separate and individual flows of fluid through the valve body. Formed integrally with the valve fitting 10 is a pair of enlarged portions 16 and 18 in which are formed tapered plug seating bores 20 and 22 respectively positioned transversely of the fluid passageways 12 and 14 respectively. The longitudinal axes of bores 20 and 22 are preferably parallel and their tapered surfaces forming the valve seats are so located that the large end of valve bore 20 is adjacent the smaller end of valve bore 22. Through this arrangement, the over-all length of valve fitting 10 may be kept at a minimum.

The enlarged fitting portions 16 and 18 are essentially integral tapered plug valve bodies which, as shown in FIGURE 1, have their opposite ends projecting transversely from both sides of the fitting. Also as shown in FIGURE 2 these portions 16 and 18 bulge laterally from the fitting 10 which is essentially wider in one transverse dimension, as viewed in FIGURE 2, than in the transverse dimension of FIGURE 1 at right angles thereto.

It will also be observed that the relatively reversed disposition of the valve body portions enables the individual valve plugs to be located in a minimum length of fitting 10 between end flanges 19 and 21. At the same time each plug stem is freely available for turning and by location of the plug stems on opposite sides mistake in identity can usually be prevented.

End flanges 19 and 21 are provided with holes for bolting to associated pipe fittings.

A lubricated tapered ported plug assembly indicated at 24 in FIGURE 3 is rotatably mounted in each of the valve seat bores 20 and 22. The tapered plug assembly 24 comprises a rotatable tapered plug 26 having a through port 28 adapted to register with the passageway 14 for the fully open position of the valve. The smaller projecting extension 30 of body 18 is threaded to receive a plug operating stem 32 suitably non-rotatably connected to the small end of plug 26. A suitable wrench fitting head 33 is formed on stem 32. Lubricant is supplied to chamber 34 at the small end of valve seat bore 22 through a suitable fitting 36 which may be the type illustrated and described in United States Letters Patent No. 2,776,026, issued January 1, 1957 and is rotated to displace lubricant under pressure into chamber 34. Lubricant so supplied to chamber 34 is distributed to the seating surfaces of tapered plug 26 and bore 22 by grooves 38, 40 and 42 in the usual manner, the grooves being interconnected by connecting or dwarf grooves in the bore (not shown) as is well known in the lubricated plug valve art. Body 18 at its larger projecting extension 31 has a threaded bore 44 receiving a threaded closure member 46. Closure 46 includes an adjusting screw 46' through which the proper seating force can be exerted on the plug 26 in bore 22.

The foregoing structure described in connection with valve assembly 24 is merely illustrative of a suitable lubricated tapered plug that may be used. For more specific details of such a lubricated tapered plug assembly, reference may be had to United States Letters Patent No. 2,398,444 issued April 16, 1946. A similar plug valve assembly is mounted in each valve body bore.

Referring again to the structure of fitting 10, external integral reinforcing ribs 50 extend longitudinally between the bases of flanges 19 and 21 and the large and small ends of bodies 16 and 18, respectively. Through this structure, maximum strength is obtained with a minimum of materials and the length of valve body 10 is held to a minimum. A further advantage of having the valve bores 20 and 22 taper in opposite directions is that the thickness of the internal common fitting wall at 41 of FIGURE 4 between the two bores is uniform and may be maintained at a minimum without sacrifice or excessive build-up of wall strength at either end. More particularly, it will be appreciated that with the foregoing inversely positioned plug valve assemblies, the minimum thickness of wall 41 meeting the requirements for withstanding the maximum pressure to which passageways 12 and 14 are to be subjected, can be maintained without the need for additional build-up of wall thickness to accommodate the formation of bores 20 and 22.

It will be noted, as shown in FIGURE 4 that each body 16 and 18 has the same effective outer radius $r$ in the plane of the passageway centerlines perpendicular to the plug axes, and that the invention enables the parallel axes of the tapered plugs to be located apart a distance $a$ which is less than $2r$.

Referring to FIGURE 6 the large end of conical plug 26 is recessed at 51 to seat spring disc 52, a flexible washer 53 being compressed therebetween at the bottom of the recess. A heavy rigid cover 54 is threaded at 55 into the body, and a rigid set screw 56 is threaded into cover 54. At its inner end set screw 56 is recessed at 57 to mount a ball seat 58, and a rigid steel spherical ball 59 is interposed between seat 58 and disc 52, suitable small conical seat recesses being formed in both as illustrated. The shank of screw 56 is formed with an annular recess at 61 and a suitable lubricated packing 62 is there introduced to seal against leakage along the screw.

At its inner end body 54 is formed with a tapered conical seat 63 opposite tapered conical seat 64 of the body bore. A steel ring gasket having its opposed peripheral surfaces of the same taper as the associated seats 63, 64 respectively is interposed between the cover and the body, so that as cover 54 is rotated by applying a wrench at 65 the gasket seating surfaces are tightly smoothly engaged with the body and cover. Since seat 63 is inclined at a greater angle to the plug axis than seat 64, the tightening of the cover will tend to increase this seating of the gasket and not merely displace it along the body bore. The seating pressure of the plug in the body is determined by rotating screw 56 as in the usual plug valve of this type, the wrench being applied at 66. The usual lubricant injector screw assembly is shown at 67.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a dual fluid passage valve assembly having a body characterized by a pair of side-by-side parallel fluid flow passages separated by a common valve body wall and transversely intersected by valve seating bores each adapted to receive a valve member for controlling fluid flow through the associated passages wherein the longitudinal axes of said fluid flow passages are required to be spaced apart by a predetermined distance such that said common wall is at least of minimum predetermined thickness to withstand the maximum pressure to which the passages are to be subjected and wherein said valve seating bores each have a minimum predetermined diameter at their intersection with its associated passage that is larger than the diameter of the associated fluid flow passage such that a valve port formed in each valve member can be made approximately equal in size to the associated passage and also to provide for seating surfaces around each port, said minimum valve seating bore diameters being such that when the passage axes are spaced apart by said predetermined distance, said bores longitudinally overlap and said common wall would be reduced in thickness below said minimum predetermined thickness; the improvement of: a plug valve fitting forming said side-by-side fluid flow passage separated by a common wall of predetermined minimum thickness, a rotatable tapered valve plug for controlling fluid flow through both passages and having a through port approximately equal to the size of its associated passage, means forming a valve plug seating bore transversely intersecting each passage in said fitting and rotatably receiving said plug, said bores being oppositely tapered and having parallel but longitudinally offset axes whereby the thickness of said common wall is not reduced below its minimum predetermined thickness.

2. In a dual fluid passage valve assembly having a body characterized by a pair of side-by-side parallel fluid flow passages separated by a common valve body wall and transversely intersected by valve seating bores each adapted to receive a valve member for controlling fluid flow through the associated passages wherein the longitudinal axes of said fluid flow passages are required to be spaced apart by a predetermined distance such that said common wall is at least of minimum predetermined thickness to withstand the maximum pressure to which the passages are to be subjected and wherein said valve seating bores each have a minimum predetermined diameter at their intersection with its associated passage that is larger than the diameter of the associated fluid flow passage such that a valve port formed in each valve member can be made approximately equal in size to the associated passage and also to provide for seating surfaces around each port, said minimum valve seating bore diameters being such that when the passage axes are spaced apart by said predetermined distance, said bores longitudinally overlap and said common wall would be reduced in thickness below said minimum predetermined thickness; the improvement of: a plug valve fitting comprising an elongated rigid section extending between two flanges and formed internally with said side-by-side parallel fluid flow passages which are separated by a common wall of minimum predetermined thickness, integral plug valve body portions formed on said section between said end flanges and being chiefly located on opposite sides of said section, each of said body portions having a plug seating bore formed therein and transversely intersecting its associated passage, said bores being oppositely tapered and having parallel but longitudinally offset axes, and a rotatable tapered plug journalled in each of said bores and having a through port approximately equal in size to its associated passage for controlling fluid flow therethrough, the arrangement of said tapered bores being such that the thickness of said common wall is not reduced below its minimum predetermined thickness.

3. In the plug valve assembly defined in claim 2, means for introducing lubricant under pressure into said bores at the valve plug seating surfaces.

4. In the plug valve assembly defined in claim 2, external longitudinal ribs between each body end projection and the adjacent flange.

5. In the plug valve assembly as defined in claim 2 wherein said fluid flow passages are parallel and the distance between the axes of said passages is less than the sum of the radii of said plugs in any given plane.

References Cited in the file of this patent
UNITED STATES PATENTS

| | | |
|---|---|---|
| 2,219,271 | Penick | Oct. 22, 1940 |
| 2,335,355 | Penick | Nov. 30, 1943 |
| 2,398,444 | Nordstrom | Apr. 16, 1946 |
| 2,433,638 | Volpin | Dec. 30, 1947 |
| 2,859,773 | Wallace | Nov. 11, 1958 |